(12) United States Patent
Johri et al.

(10) Patent No.: US 10,974,714 B2
(45) Date of Patent: Apr. 13, 2021

(54) METHOD AND SYSTEM FOR TORQUE RESERVE ESTIMATION

(71) Applicant: Ford Global Technologies, LLC, Dearborn, MI (US)

(72) Inventors: Rajit Johri, Canton, MI (US); Christopher John Teslak, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/250,787

(22) Filed: Jan. 17, 2019

(65) Prior Publication Data

US 2020/0231136 A1    Jul. 23, 2020

(51) Int. Cl.
| | | |
|---|---|---|
| *F16H 61/04* | (2006.01) | |
| *B60W 20/11* | (2016.01) | |
| *F16H 61/02* | (2006.01) | |
| *B60W 20/30* | (2016.01) | |

(52) U.S. Cl.
CPC ............ *B60W 20/11* (2016.01); *B60W 20/30* (2013.01); *F16H 61/0213* (2013.01); *F16H 2061/0218* (2013.01)

(58) Field of Classification Search
CPC ...... B60W 20/11; B60W 20/30; B60W 20/10; B60W 30/19; B60W 2710/083; B60W 2540/10; B60W 2510/081; B60W 2510/244; B60W 2510/087; B60W 10/06; B60W 10/08; B60W 10/30; B60W 2710/0666; F16H 61/021; F16H 61/0213; F16H 2061/0218; F16H 2059/147; F16H 2306/52; F16H 61/04; B60K 2006/4825; B60K 6/387

See application file for complete search history.

(56) References Cited

U.S. PATENT DOCUMENTS

| | | | | |
|---|---|---|---|---|
| 4,724,723 A | * | 2/1988 | Lockhart | B60W 30/18 477/102 |
| 5,899,286 A | * | 5/1999 | Yamaguchi | B60W 10/08 180/65.21 |
| 7,073,485 B2 | * | 7/2006 | Truscott | F02P 5/1512 123/406.22 |
| 7,264,570 B2 | * | 9/2007 | Heap | B60W 10/105 477/3 |
| 7,878,175 B2 | | 2/2011 | Livshiz et al. | |
| 8,374,771 B2 | * | 2/2013 | Falkenstein | B60W 10/06 701/105 |
| 8,439,796 B2 | * | 5/2013 | Doering | F02D 41/023 477/33 |

(Continued)

FOREIGN PATENT DOCUMENTS

WO    WO-2009127452 A1 * 10/2009 ............ B60W 20/15

*Primary Examiner* — Hunter B Lonsberry
*Assistant Examiner* — Daniel M. Robert
(74) *Attorney, Agent, or Firm* — David Kelley; McCoy Russell LLP

(57) ABSTRACT

Methods and systems are provided for estimating a maximum available torque reserve prior to a gear upshift and then during the upshift, generating the torque reserve to fill a torque hole. In one example, a method may include estimating a maximum torque reserve based on each of a driver torque demand, an auxiliary system demand, and a maximum generable engine torque and then opportunistically generating the torque reserve.

15 Claims, 4 Drawing Sheets

(56) References Cited

U.S. PATENT DOCUMENTS

| | | | | |
|---|---|---|---|---|
| 8,731,790 | B2* | 5/2014 | Jess | B60W 30/19 |
| | | | | 701/54 |
| 8,808,141 | B2* | 8/2014 | Shelton | B60W 30/19 |
| | | | | 477/5 |
| 9,002,550 | B2* | 4/2015 | Brennan | B60W 20/00 |
| | | | | 701/22 |
| 9,067,587 | B1* | 6/2015 | Johri | B60W 10/06 |
| 9,260,102 | B2 | 2/2016 | Teslak et al. | |
| 10,293,674 | B1* | 5/2019 | Wilton | B60K 6/36 |
| 2012/0130608 | A1* | 5/2012 | Fujii | F16H 63/502 |
| | | | | 701/54 |
| 2013/0296127 | A1 | 11/2013 | Shelton et al. | |
| 2015/0275784 | A1* | 10/2015 | Whitney | F02D 41/0087 |
| | | | | 701/102 |
| 2016/0244043 | A1* | 8/2016 | Nefcy | B60W 20/30 |
| 2016/0319758 | A1* | 11/2016 | Pallett | F02D 41/123 |
| 2018/0362017 | A1* | 12/2018 | Meyer | B60W 10/06 |

* cited by examiner

METHOD AND SYSTEM FOR TORQUE RESERVE ESTIMATION

FIELD

The present description relates generally to methods and systems for estimating and generating a torque reserve for torque hole fill in a hybrid vehicle.

BACKGROUND/SUMMARY

Some hybrid vehicles may include a modular hybrid transmission (WIT). Therein, a driveline disconnect clutch can mechanically and selectively isolate an engine from the transmission system and vehicle wheels so that the transmission and wheels can operate independently from the engine. The driveline disconnect clutch allows torque to be provided to the driveline to propel the vehicle even if the engine has stopped rotating. During a gear upshift, with input torque being substantially constant, the output torque may decrease as the gear multiplication drops, thereby creating a "torque hole". The engine powertrain control system may attempt to reduce and/or eliminate the torque hole during an upshift event by requesting an increase in transmission input torque during the upshift.

Various approaches are provided for torque control during transmission shifting to fill the torque hole. In one example approach, as shown by Shelton et al., in U.S. Pat. No. 8,808,141, various strategies may be used to increase transmission input torque, such as, throttle and spark timing control of the engine. The throttle may be opened more than required to achieve driver demand torque and the spark may be retarded to maintain the same engine torque. This strategy may create a torque reserve where the engine may provide increased transmission input torque.

However, the inventors herein have recognized potential issues with such systems. As one example, the torque reserve created by the methods described by Shelton et al. may not be sufficient to fill the torque hole. Changes in throttle opening or an amount of spark retard may not provide the desired increase in torque to fill the hole. Inadequate torque hole fill may increase torque disturbances transmitted from the powertrain to the vehicle body during a gear change, thereby causing an undesirable shift shock experienced by the operator.

In one example, the issues described above may be addressed by a method for a hybrid vehicle, comprising: generating a torque reserve during a gear upshift by adjusting vehicle operation responsive to an estimated maximum torque reserve based on each of a driver torque demand, an auxiliary system demand, and a maximum generable engine torque. In this way, by preemptively estimating maximum available torque reserve, the torque hole filling may be improved during a subsequent gear shift.

As one example, prior to a request for torque hole fill, a maximum available torque reserve may be estimated based on a maximum available motor torque reserve and a maximum available engine torque reserve. During vehicle operation via machine torque (engine off), a maximum available motor torque reserve may be estimated based on a driver torque demand and a maximum deliverable motor torque. During vehicle operation via a combination of engine torque and machine torque, a split between engine torque and motor torque may be estimated based on driver torque demand and auxiliary systems torque demand. A maximum available motor torque reserve may be estimated based on motor torque delivered and a maximum deliverable motor torque. A maximum possible torque that can be generated by retarding spark from maximum brake torque (MBT) may be estimated. A maximum available engine torque reserve may be estimated based on engine torque delivered for vehicle operation and the maximum generable engine torque. The maximum available torque reserve may be a combination of the estimated maximum available motor torque reserve and the estimated maximum available engine torque reserve. Based on the maximum available torque reserve, engine operating parameters such as throttle opening, spark timing etc. and motor output may be adjusted during a gear upshift to provide the desired transmission input torque for torque hole fill.

In this way, by preemptively estimating the maximum available torque reserve, the torque hole may be efficiently filled without torque disturbances being transmitted to the vehicle body. By ensuring smoother torque hole filling, operator driving experience may be improved. The technical effect of estimating the maximum generable torque by retarding spark is that an amount of spark timing adjustment may be adjusted to provide the desired torque for a complete filling of the hole. Overall, by coordinating engine torque and motor torque for torque hole fill, gear changes may be expedited and transmission system efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
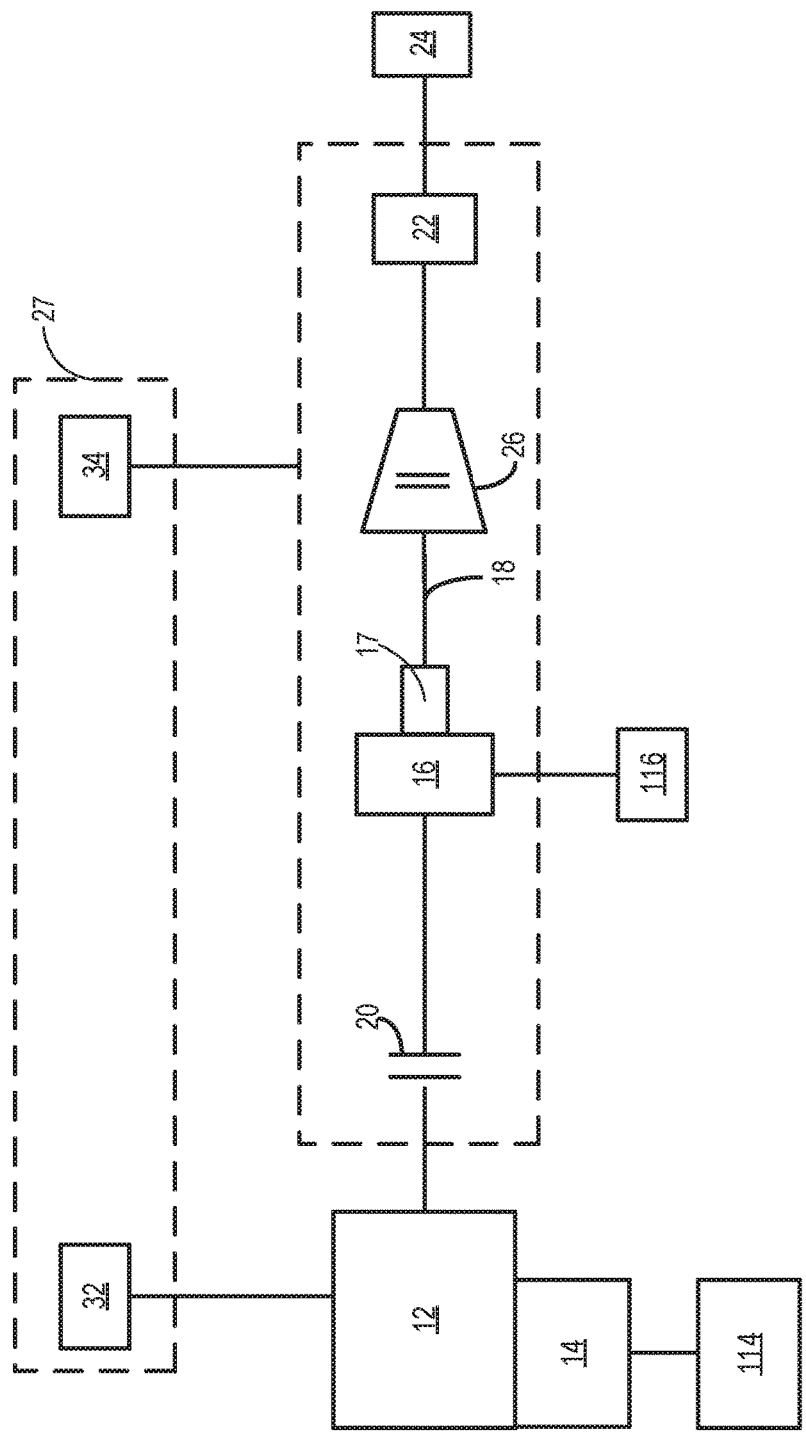
FIG. 1 shows an example embodiment of a vehicle driveline configuration.
Figure 2:
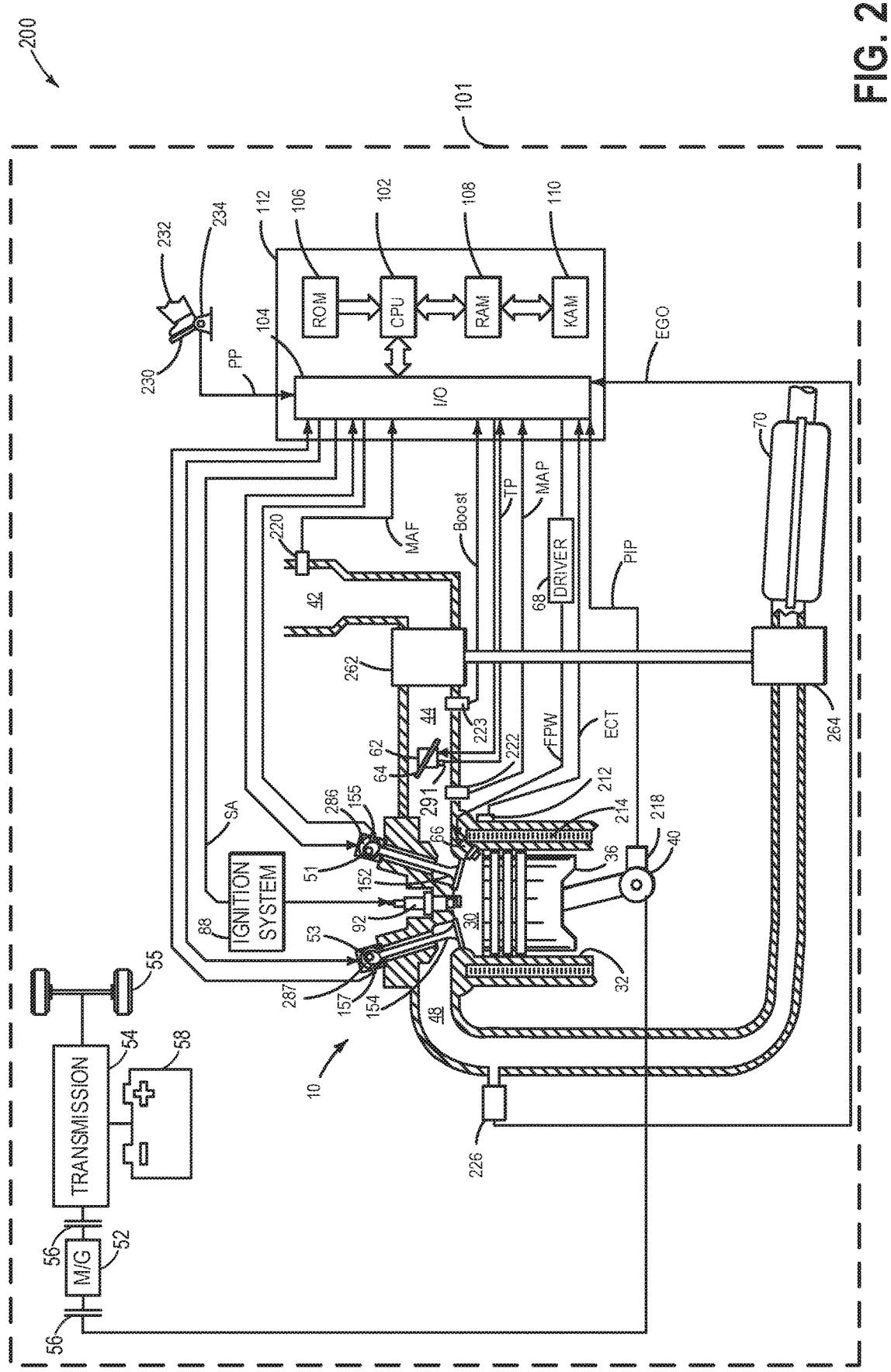
FIG. 2 shows a schematic of an engine system coupled to a hybrid vehicle.

The following description relates to systems and methods for estimating a maximum available torque reserve and then generating a torque reserve for torque hole fill in a hybrid vehicle system including an engine and an electric motor coupled to a transmission via a clutch as shown in FIGS. 1-2. An engine controller may be configured to perform a control routine, such as the routine of FIG. 3 to estimate a maximum available torque reserve that may be generated for filling a torque hole during a transmission gear upshift. An example estimation of the maximum available torque reserve and a subsequent generation of the torque reserve for torque hole filling during a gear upshift is shown in FIG. 4.

FIG. 1 shows a schematic of a driveline of a vehicle with a modular hybrid transmission (WIT) system. In a WIT vehicle, a traction motor is disposed between an automatic transmission and an engine. The engine may be selectively coupled to the traction motor and the automatic transmission by a disconnect clutch. The disconnect clutch may allow the vehicle to operate in an electric-only drive mode with the traction motor acting as the primary power source (engine disconnected), in a hybrid mode with both the traction motor and the engine propelling the vehicle, and/or in an engine-only mode in which the vehicle is propelled by the engine alone.

An engine 12 may be operatively connected to a starter motor/generator 14 that may be used to crank the engine 12 when engine start is desired. Starter 14 may be described as a lower power starting device. A lower voltage battery 114 may supply power to the starter motor 14 during engine cranking. Starter 14 may be directly mounted to the front of the engine or the rear of the engine. In some examples, starter 14 may selectively supply torque to crankshaft via a belt or chain. An electrical machine 16, or traction motor, may be operatively connected to a driveline 18 and positioned between the engine 12 and a transmission system 22 (including a gear box). A high voltage battery 116 may supply power to drive the motor 16. A transmission oil pump 17 located on the same shaft as the electric motor generator may provide oil flow through the transmission 22 for lubrication and hydraulic operation. This main pump 17 may be supplemented by an electric auxiliary pump. The engine 12 may be selectively coupled to the motor 16 and the transmission 22 by a disconnect clutch 20. Torque transmitted from the engine 12 and motor 16 may be provided through the driveline 18 to the transmission 22, which provides torque to drive the wheels 24.

The vehicle may include a controller 27, such as a vehicle system controller (VSC), for controlling various vehicle systems and subsystems. The controller 27 may include various types of computer readable storage media to implement volatile and/or persistent memory. In one embodiment, controller 27 is a VSC that includes an engine control unit (ECU) 32 and a transmission control unit (TCU) 34. The ECU 32 is electrically connected to the engine 12 for controlling the operation of the engine 12. The TCU 34 is electrically connected to and controls the motor 16 and the transmission 22. The ECU 32 is in communication with the TCU 34 and other controllers (not shown) over a vehicle network using a common bus protocol (e.g., CAN), in accordance with one or more embodiments of the present disclosure. Although the illustrated embodiment depicts the VSC 27 functionality for controlling the MHT powertrain as being contained within two controllers (ECU 32 and TCU 34), other embodiments of the hybrid vehicle may include a single VSC controller and/or any other combination of controllers for controlling the MHT powertrain.

A torque converter 26 may be provided between the transmission 22 and the engine 12 and/or motor 16 to provide torque through the transmission 22 to the wheels 24. Torque converter 26 includes a turbine to output torque to an input shaft. The Input shaft may mechanically couple torque converter 26 to the transmission 22. Torque converter 26 may include a torque converter bypass lock-up clutch (TCC). Torque is directly transferred from impeller to turbine when TCC is locked. TCC is electrically operated by the controller. Alternatively, TCC may be hydraulically locked. In one example, the torque converter may be referred to as a component of the transmission. Torque converter impeller speed and position may be determined via a dedicated sensor. Torque converter turbine speed and position may be determined via a position sensor.

When torque converter clutch is fully disengaged, torque converter 26 may transmit engine torque to transmission 22 via fluid transfer between the torque converter turbine and torque converter impeller, thereby enabling torque multiplication. In contrast, when torque converter clutch is fully engaged, the engine output torque is directly transferred via the torque converter clutch to an input shaft of transmission 22. Alternatively, the torque converter clutch may be partially engaged, thereby enabling the amount of torque directly relayed to the transmission to be adjusted. The controller may be configured to adjust the amount of torque transmitted by torque converter 26 by adjusting the torque converter clutch in response to various engine operating conditions, or based on a driver-based engine operation request.

In an alternate embodiment, a launch clutch may be provided between the transmission 22 and the engine 12 and/or motor 16 to provide torque through the transmission 22 to the wheels 24.

Transmission 22 such as an automatic transmission may include gear clutches and forward clutch. The gear clutches and the forward clutch may be selectively engaged to propel a vehicle. Torque output from the automatic transmission 22 may in turn be relayed to wheels 24 to propel the vehicle via an output shaft. Output shaft may deliver torque from transmission 22 to wheels 24 via a differential which includes a first gear and a second gear. Automatic transmission 22 may transfer an input driving torque at the input shaft responsive to a vehicle traveling condition before transmitting an output driving torque to the wheels 24.

Further, a frictional force may be applied to wheels 24 by engaging wheel friction brakes. In one example, wheel friction brakes may be engaged in response to the driver pressing his foot on a brake pedal (not shown). In other examples, the controller may engage wheel friction brakes. In the same way, a frictional force may be reduced to wheels 24 by disengaging wheel friction brakes in response to the driver releasing his foot from a brake pedal. Further, vehicle brakes may apply a frictional force to wheels 24 via the controller as part of an automated engine stopping procedure.

The shifting of an automatic transmission may be accompanied by applying and/or releasing multiple friction elements (such as plate clutches, band-brakes, etc.) that change speed and torque relationships by altering gear configurations. Friction elements may be actuated hydraulically, mechanically or through other strategies using one or more associated actuators that may be in communication with a microprocessor-based controller implementing a particular control strategy based on signals received from one or more sensors. A realizable combination of gear configurations determines a total number of ratio steps. Although various planetary and lay-shaft gear configurations are found in modern automatic transmissions, the basic principle of shift kinematics is similar.

Driver requests may be interpreted by the VSC. These requests include gear selection (PRNDL) and accelerator pedal position (APPS) to interpret the driver's intention of wheel torque. The driver's input on the brake pedal (BPPS) may be interpreted by the Brake System Control Module (BSCM) and a wheel torque modification request may be sent to VSC to adjust the final wheel torque. A high voltage battery controller (BECM) may monitor the battery temperature, voltage, current, state of charge (SOC) and determine the maximum allowable discharge power limit and the maximum allowable charge power limit of a high voltage battery 116 powering the motor 16. The VSC determines the powertrain operating point to maintain battery state of charge, minimize fuel consumption and deliver the driver demanded vehicle operation. A Torque Control (TC) feature inside VSC is in charge of determining torque split between the engine and motor torque command.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. In the case of a synchronous upshift, a first torque establishing element, referred to as an off-going clutch (OGC), may be released while a second torque establishing element, referred to as an on-coming clutch (OCC), may be engaged to lower a transmission gear ratio and change the torque flow path through the transmission. A typical upshift event may be divided into a preparatory phase, a torque phase, and an inertia phase. During the preparatory phase, the OCC may be stroked to prepare for its engagement while the OGC torque-holding capacity may be reduced as a step toward its release. During the torque phase, which may be referred to as a torque transfer phase, the OGC torque may be reduced toward a value of zero or a non-significant level to prepare it for disengagement. Simultaneously, the OCC torque may be raised from a non-significant level, thereby initiating engagement of the OCC according to a conventional upshift control strategy. The timing of the OCC engagement and the OGC disengagement may result in a momentary activation of two torque flow paths through the gearing, thereby causing torque delivery to drop momentarily at the transmission output shaft. During the torque transfer, with input torque typically remaining substantially constant, the output torque may fall as the gear multiplication drops. This condition, which may be referred to as a "torque hole," occurs before disengagement of the OGC. A vehicle occupant may perceive a "torque hole" as an undesirable shift shock. When the OCC develops enough torque, the OGC is released, marking the end of the torque phase and the beginning of the inertia phase. During the inertia phase, the OCC torque may be adjusted to reduce its slip speed toward zero. When the OCC slip speed reaches zero, the shift event is completed.

Torque hole filling is the process by which the transmission control strategy attempts to reduce and/or eliminate the transmission output torque hole during an upshift event. Control strategies for reducing torque disturbances include providing an increase in transmission input torque during the torque phase of the upshift. The increase in transmission input torque may be synchronized with the OCC and OGC to deliver a consistent shift feel. Various techniques and/or strategies may be used to increase transmission input torque, such as, throttle and spark timing control of the engine. The throttle may be opened more than required to achieve driver demand torque and the spark may be retarded to maintain the same engine torque. In order to accurately calculate the increase in transmission input torque during the torque phase of the upshift, it is desired to know the maximum available torque reserve from engine and motor that may be achieved. An estimation of a maximum torque reserve may be carried out prior to creation of the torque reserve. The non-zero torque reserve may be estimated based on one or more of a driver torque demand, an auxiliary system torque demand, a maximum generable engine torque, and a maximum available motor torque. The maximum available motor torque may be based on one or more of a state of charge of a battery powering an electric motor, the driver torque demand, and the auxiliary system torque demand; and the maximum generable engine torque may be based on one or more of a maximum air path reserve that can be generated by retarding spark from MBT the driver torque demand, and the auxiliary system torque demand.

During the gear upshift, the torque reserve may be generated by one or more of retarding spark from maximum brake torque (MBT) and increasing a throttle opening. The generated torque reserve may increase transmission input torque to a target torque, the target torque based on a desired transmission output torque at the higher gear ratio. In this way, the generated torque reserve may compensate for a difference between a transmission input torque and a desired transmission output torque during a torque phase of the upshift event.

FIG. 2 is a schematic diagram showing a vehicle system 200 comprising a vehicle 101 and an engine system 103. FIG. 2 shows one cylinder of a multi-cylinder engine 10 in the engine system 103. The engine 10 in FIG. 2 may be the engine 12 of FIG. 1. Engine 10 may be controlled at least partially by a control system including controller 112 and by input from a vehicle operator 232 via an input device 230. In this example, input device 230 includes an accelerator pedal and a pedal position sensor 234 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 152 and exhaust valve 154. In some embodiments, combustion chamber 30 may include two or more intake valves and/or two or more exhaust valves.

In this example, intake valve 152 and exhaust valves 154 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 112 to vary valve operation. For example, valve operation may be varied as part of pre-ignition abatement or engine knock abatement operations. The position of intake valve 152 and exhaust valve 154 may be determined by position sensors 155 and 157, respectively. In alternative embodiments, intake valve 152 and/or exhaust valve 154 may be controlled by electric valve actuation. For example, cylinder 30 may alternatively include an intake valve controlled via electric valve actuation and an exhaust valve controlled via cam actuation including CPS and/or VCT systems.

In one example, cam actuation systems 51 and 53 are variable cam timing systems that include cam phasers 286 and 287 that are hydraulically actuated via oil from a variable flow oil pump 275. Under some conditions, an output flow rate of variable flow oil pump 275 may be varied to control a response time for cam phasers 286 and 287 to change a position of the cams based on operating conditions. For example, under high engine loads, the output flow rate of the variable flow oil pump 275 may be increased, so that the cam phasers 286 and 287 change position more quickly and correspondingly change a position of the cams more quickly than under low engine loads.

Engine 10 may further include a compression device such as a turbocharger or supercharger including at least a compressor 262 arranged along intake manifold 44. For a turbocharger, compressor 262 may be at least partially driven by a turbine 264 (e.g. via a shaft) arranged along exhaust passage 48. For a supercharger, compressor 262 may be at least partially driven by the engine and/or an electric machine, and may not include a turbine. Thus, the amount of compression provided to one or more cylinders of the engine via a turbocharger or supercharger may be varied by controller 112. A boost sensor 223 may be positioned downstream of the compressor in intake manifold 44 to provide a boost pressure (Boost) signal to controller 112.

Fuel injector 66 is shown coupled directly to combustion chamber 30 for injecting fuel directly therein in proportion to the pulse width of signal FPW received from controller 112 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30. Fuel injector 66 may be controlled to vary fuel injection in different cylinder according operating conditions. For example, controller 112 may command fuel injection to be stopped in one or more cylinders as part of pre-ignition abatement operations so that combustion chamber 30 is allowed to cool. Further, intake valve 152 and/or exhaust valve 154 may be opened in conjunction with the stoppage of fuel injection to provide intake air for additional cooling.

Intake passage 42 may include a throttle 62 having a throttle plate 64. In this particular example, the position of throttle plate 64 may be varied by controller 112 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 112 by throttle position signal TP. Intake passage 42 may include a mass air flow sensor 220 and a manifold air pressure sensor 222 for providing respective signals MAF and MAP to controller 112.

Ignition system 88 can provide an ignition spark to combustion chamber 30 via spark plug 92 in response to spark advance signal SA from controller 112, under select operating modes. Controller 112 may vary signal SA based on operating conditions. For example, controller may retard signal SA in order to retard spark in response to an indication of engine knock as part of engine knock abatement operations. Though spark ignition components are shown, in some embodiments, combustion chamber 30 or one or more other combustion chambers of engine 10 may be operated in a compression ignition mode, with or without an ignition spark.

The controller 112 is shown in FIGS. 1 and 2 is a microcomputer, including a microprocessor unit 102, input/output ports 104, an electronic storage medium for executable programs and calibration values shown as read only memory chip 106 in this particular example, random access memory 108, keep alive memory 110, and a data bus. The controller 112 may receive various signals from sensors coupled to the engine 10, in addition to those signals previously discussed, including measurement of exhaust and intake AFR from oxygen sensor 226, inducted mass air flow (MAF) from the mass air flow sensor 220; engine coolant temperature (ECT) from a temperature sensor 212 coupled to a cooling sleeve 214; a profile ignition pickup signal (PIP) from a Hall effect sensor 218 (or other type) coupled to crankshaft 40; throttle position (TP) from a throttle position sensor; absolute manifold pressure signal, MAP, from the sensor 222, and vehicle angular velocity via an yaw rate sensor. Engine speed signal, RPM, may be generated by the controller 112 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque.

The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug (not shown), etc.

The controller 112 receives signals from the various sensors of FIG. 1 and employs the various actuators of FIG. 1 to adjust engine operation based on the received signals and instructions stored on a memory of the controller 112. In one example, in response to a request for torque hole fill during a gear upshift, spark timing may be retarded from MBT to increase the engine torque reserve that may be used for filling the torque hole. A method for preemptively estimating a maximum available torque reserve to be used for torque hole fill during a gear upshift is discussed in relation to FIG. 3.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. In one example, electric machine 52 in the electric machine 16 in FIG. 1 and the battery 116 in FIG. 1. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 112 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. In one example, engaging the clutch includes an operator pressing on the clutch pedal with his foot and disengaging the clutch includes removing the foot form the clutch pedal. Transmission 54 may be a gearbox, a planetary gear system, or another type of transmission. In one example, transmission 54 may be the transmission system 22 in FIG. 1. The powertrain may be configured in various manners including as a parallel, a series, or a series-parallel hybrid vehicle. In one example, transmission 54 may be an automatic transmission system wherein during vehicle propulsion in forward direction, the operator may not have to manually specify the gear ratios. In an automatic transmissions system, engine power is transmitted to the wheels via a torque converter without the presence of a physical clutch pedal in the driver compartment. In another example, transmission 54 may be a manual transmission system wherein during vehicle propulsion in forward direction, the operator may manually shift the gear while engaging a clutch, the clutch pedal being present in the driver compartment.

Electric machine 52 receives electrical power from a traction battery 58 to provide torque to vehicle wheels 55. Electric machine 52 may also be operated as a generator to provide electrical power to charge traction battery 58, for example during a braking operation.

In this way, the components of FIGS. 1-2 enable a system for a hybrid vehicle system comprising: a controller with computer readable instructions stored on non-transitory memory that, when executed, cause the controller to: prior to a request for a motor hybrid transmission system gear ratio upshift, estimate a non-zero torque reserve based on one or more of a driver torque demand, an auxiliary system torque demand, a maximum generable engine torque, and a maximum available motor torque, and in response to the request for the gear ratio upshift, generate the torque reserve by adjusting spark timing and/or throttle opening.

Figure 3:
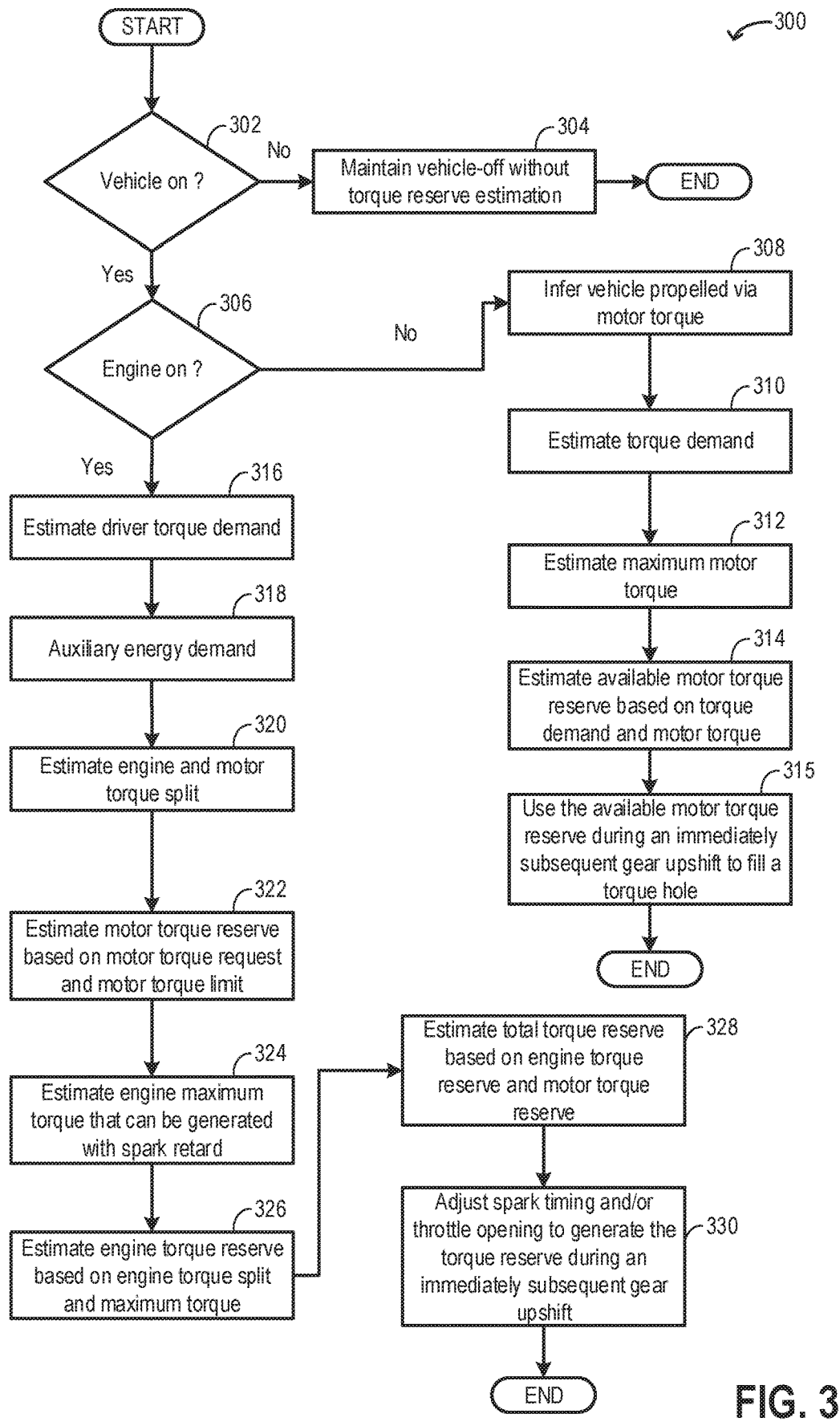
FIG. 3 is a flowchart illustrating estimation of a maximum available torque reserve.
Figure 4:
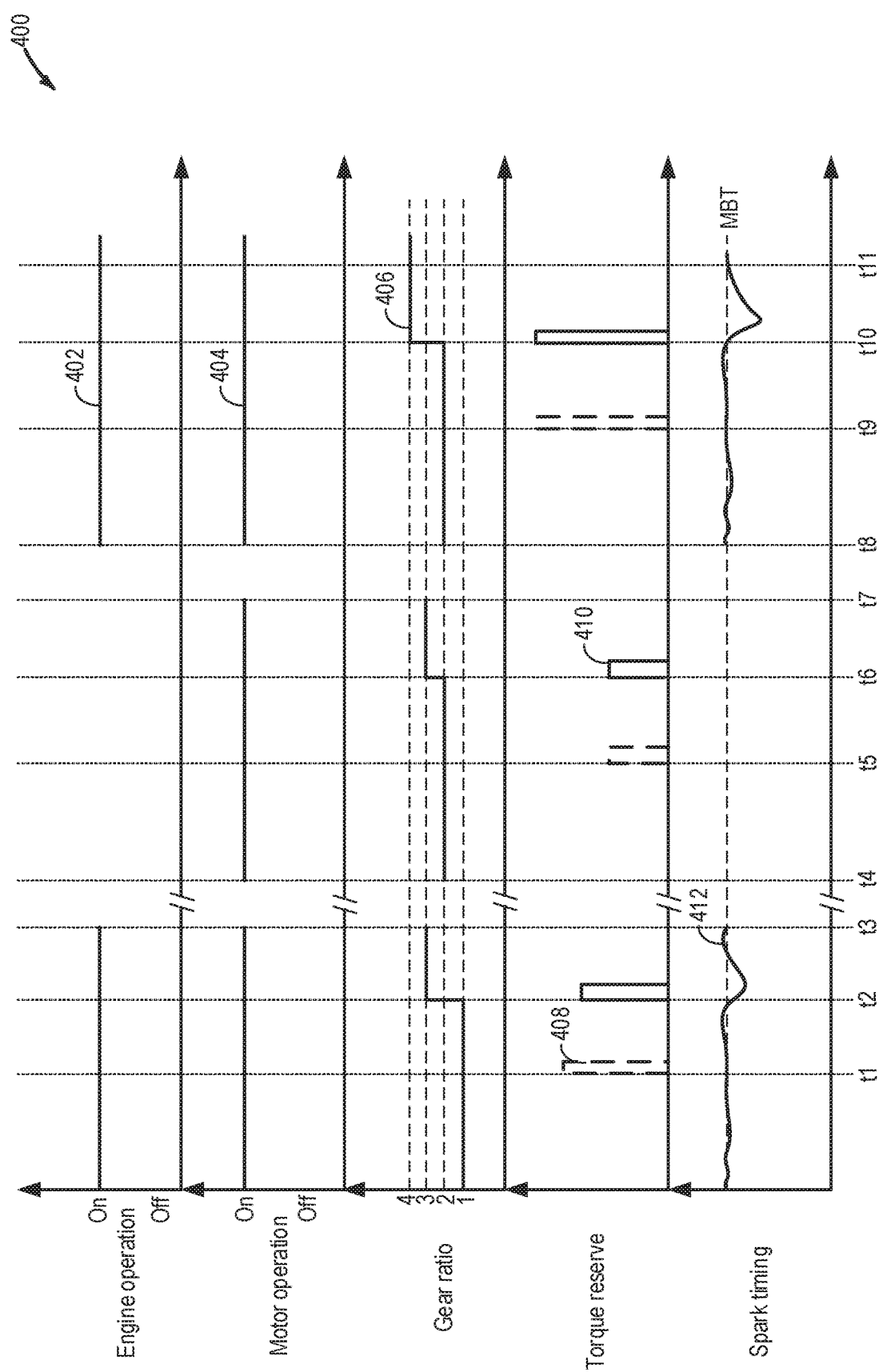
FIG. 4 shows an example estimation and generation of torque reserve to fill a torque hole.

FIG. 3 shows an example method 300 that can be implemented to estimate a maximum available torque reserve that may be generated during a gear upshift. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, the routine includes determining if the vehicle is on such as if the vehicle is being operated. During a vehicle-on condition, the vehicle may be propelled using engine torque and/or machine torque. Also, during the vehicle-on condition, based on driver torque demand, a transmission system gear may be selected other than neutral or park.

If it is determined that the vehicle is not in an on condition, at 304, the vehicle-off condition may be maintained without estimation of torque reserve. As described in relation to FIG. 1, torque hole fill is a process by which a transmission output torque hole may be reduced or eliminated during a gear upshift event by requesting an increase in transmission input torque during the torque phase of the upshift. Torque reserve may be the maximum possible torque that may be generated from engine and/or motor operation that may be used for torque hole fill for smooth gear transition.

If it is determined that the vehicle is in an on-condition, at 306, the routine includes determining if the engine is on. An engine-on condition may include rotation of the engine at a non-zero engine speed. Combustion of fuel and air in the engine cylinders may spin the engine to provide the requested torque (for vehicle propulsion). If it is determined that the vehicle is in an on condition (is being operated) but the engine is not in an on condition (engine off), at 308, it may be inferred that the vehicle is being propelled via motor torque. A battery may supply power to operate the motor which provides the requested torque (for vehicle propulsion). At 310, a torque demand may be estimated. A driver torque demand may be proportional to on output of an accelerator pedal position sensor. In one example, the controller may use a look-up table to estimate the driver torque demand with the accelerator pedal position being the input and the driver torque demand being the output. The driver torque demand may be further based on road conditions and ambient conditions. In addition to driver requested torque, power from the motor may be used to operate vehicle auxiliary components such as cabin heating/cooling system. Hence the torque demand may be a combination of driver torque demand and auxiliary system torque (power) demand.

At 312, a maximum available motor torque may be estimated. The maximum available motor torque may be based on an available battery power and battery voltage which in turn may depend on a state of charge (SOC) of the battery powering the motor, a speed of the motor, and motor temperature. The maximum available motor torque may be a function of one or more of the battery SOC and motor speed. The maximum available motor torque may be directly proportional to the battery SOC and inversely proportional to the motor speed. In one example, the controller may use a look-up table to estimate the maximum available motor torque with the battery SOC and motor speed being the inputs and the maximum available motor torque being the output.

At 314, a maximum available motor torque reserve may be estimated based on the torque demand and the maximum available motor torque. The maximum available torque reserve may be the amount of torque which may be generated by the motor during the current operation of the vehicle. The maximum available torque reserve may be higher than the torque demand and the excess torque may be opportunistically used for torque hole fill. The maximum available motor torque reserve may be given by equation 1:

$$\tau_{rsv}^{max} = \tau_{mtr}^{max} - \tau_{DD} \tag{1}$$

where $\tau_{rsv}^{max}$ is the maximum available motor torque reserve, $\tau_{mtr}^{max}$ is the maximum available motor torque, and $\tau_{DD}$ is the torque demand.

At 315, upon an immediately subsequent gear upshift, the available motor torque may be used to compensate for a difference (torque hole) in torque between the actual transmission input torque and a target transmission input torque. The controller may calibrate the target transmission input based on a desired output shaft torque for smooth transition of one gear ratio to another (during the torque phase of the upshift). The magnitude of the torque hole may be based on the gear upshift and engine operating conditions. In one example, if the gear ratio is shifted directly from a first gear to a third gear, the torque hole may be higher relative to a gear ratio shift from the first gear to a second gear. As previously described, an upshift event may be divided into a preparatory phase, a torque phase, and an inertia phase. In order to fill the torque hole during the torque phase, the motor torque reserve may be instantaneously available.

If at 306, it is determined that the engine is on, at 316, the controller may estimate a driver torque demand. A driver torque demand may be proportional to on output of an accelerator pedal position sensor. In one example, the controller may use a look-up table to estimate the driver torque demand with the accelerator pedal position being the input and the driver torque demand being the output. At 318, auxiliary energy demand for the vehicle may be estimated. In one example, the auxiliary energy demand may include energy used to operate the vehicle cabin heating/cooling system, audio system, cabin lighting, wiper blades, etc.

At 320, a torque split between the engine and the electric motor may be estimated. In one example, the electric motor torque may be given by equation 2 and the engine torque may be given by equation 3.

$$\tau_{mtr}^{req}\tau_{EM} \qquad (2)$$

where $\tau_{mtr}^{req}$ is the motor torque and $\tau_{EM}$ is the auxiliary energy demand.

$$\tau_{eng}^{req}=\tau_{DD}-\tau_{EM} \qquad (3)$$

where $\tau_{eng}^{req}$ is the engine torque, $\tau_{DD}$ is the driver torque demand, and $\tau_{EM}$ is the auxiliary energy demand.

At 322, a maximum available motor torque reserve may be estimated based on the motor torque and a maximum available motor torque may be estimated. The maximum available motor torque may be directly proportional to the state of charge (SOC) of the battery powering the motor. The maximum available motor torque reserve may be given by equation 4.

$$\tau_{mtr}^{avail}=\tau_{mtr}^{max}-\tau_{mtr}^{req} \qquad (4)$$

where $\tau_{mtr}^{avail}$ is the maximum available motor torque reserve, $\tau_{mtr}^{max}$ is the maximum available motor torque, and $\tau_{mtr}^{req}$ is the motor torque.

At 324, an engine maximum torque that may be generated with spark retard may be estimated. By temporarily retarding spark (from maximum brake torque) for one or more combustion events, an air path reserve may be generated in the engine and engine torque output may be increased. The throttle opening may also be increased to increase the torque output. However, retarding spark beyond a threshold time may result in misfire. Therefore, an amount of spark retard may be based on a misfire threshold. The misfire threshold may be calibrated based on engine operating conditions such as engine load, engine speed, and engine temperature. The maximum possible torque that can be generated with spark retard without misfire may be given by equation 5.

$$TR_{THF} = \frac{\tau_{eng}^{req}}{\tau_{req}^{base,max}} \qquad (5)$$

where $TR_{THF}$ is the maximum possible torque ratio that can be generated with maximum spark retard (without misfire), $\tau_{eng}^{req}$ is the engine torque, and $\tau_{req}^{base,max}$ the maximum air path reserve eng that can be generated by retarding spark during current engine operation.

At 326, a maximum available engine torque reserve may be estimated based on the engine torque split and the maximum possible torque that can be generated with spark retard. The maximum available engine torque reserve may be given by equation 6.

$$\tau_{eng}^{avail} = \max\left(0, \tau_{eng}^{req} * \left(\frac{1 - TR_{THF}}{TR_{THF}}\right)\right) \qquad (6)$$

where $\tau_{eng}^{avail}$ is the maximum available engine torque reserve, $\tau_{eng}^{req}$ is the engine torque, and $TR_{THF}$ is the maximum possible torque that can be generated with spark retard. The equation 6 is set to have a minimum value of zero to ensure that the maximum available engine torque reserve is not negative.

AT 328, a total (maximum) available torque reserve may be estimated based on the maximum available motor torque reserve and the maximum available engine torque reserve. The total available torque reserve may be given by equation 7.

$$\tau_{rsv}^{max}=\tau_{eng}^{avail}+\tau_{mtr}^{avail} \qquad (7)$$

where $\tau_{rsv}^{max}$ is the total available torque reserve, $\tau_{eng}^{avail}$ is the maximum available engine torque reserve and $\tau_{mtr}^{avail}$ is the maximum available motor torque reserve.

At 330, during an immediately subsequent gear upshift, spark timing and/or throttle opening may be adjusted to generate the torque reserve. The torque reserve may provide the additional torque to fill the torque hole created due to difference in transmission input and output torque during a gear upshift. The controller may calibrate a target transmission input based on a desired output shaft torque for smooth transition of one gear ratio to another. In one example, the controller may use a look-up table to determine an amount of spark retard from maximum brake torque (MBT) and a degree of opening of the throttle that may be used to generate the torque reserve (for torque hole filling) based on a magnitude of the torque hole. The magnitude of the torque hole may be used as an input and spark timing and throttle opening may be the output. As an example, an amount of spark retard may be directly proportional to the magnitude of the torque hole, the spark timing being retarded to a higher degree in response to the magnitude of the torque hole being higher. In another example, the torque hole may be filled by increasing throttle opening while maintaining spark at MBT. In yet another example, the torque hole may be filled by providing motor torque without increasing engine torque output by spark retard and/or throttle opening.

In this way, prior to an upshift event in a transmission system gear ratio, during a first condition, a torque reserve may be estimated based on torque demand and maximum available motor torque, during a second condition, the torque reserve may be estimated based on a torque demand, a maximum generable engine torque, and a maximum available motor torque, and during the upshift event, the torque reserve may be generated. The first condition may include the vehicle being operated by an electric motor with an engine non-combusting, and the second condition includes the vehicle being operated by a combination of engine torque and motor torque. By preemptively estimating the maximum available torque reserve, the torque hole may be efficiently filled and a gear upshift process may be improved.

FIG. 4 shows an example timeline 400 illustrating estimation of the maximum available torque reserve and a subsequent generation of the torque reserve for torque hole filling during a gear upshift. The horizontal (x-axis) denotes time and the vertical markers t1-t11 identify significant times in the routine for torque reserve estimation and generation.

The first plot, line 402, shows operation of an engine coupled to a hybrid vehicle. During engine operation, fuel and air is combusted in engine chambers to provide engine torque which is used for vehicle operation. The second plot, line 404, shows operation of an electric machine coupled to the hybrid vehicle. During motor operation, power from the motor may be used entirely or partially for vehicle operation. The third plot, line 406, shows a gear ratio of a transmission system coupling the engine and the motor to the wheels. In this example, four gear ratios, one, two, three, and four are shown. The fourth plot, line 408, shows an estimated maximum possible torque reserve and line 410, shows a generated torque reserve for torque hole fill during a gear ratio upshift. The fifth plot, line 412, shows spark timing relative to maximum brake torque (MBT).

Prior to time t1, both the engine and the motor are operated to propel the vehicle. Engine torque is used to provide the driver torque demand and the motor torque is used to provide for the auxiliary power demands (such as operating the cabin air conditioning system). The transmission system is at the first gear ratio and torque is being transmitted from an input shaft to an output shaft of the transmission system, the input shaft connected to the engine and the motor while the output shaft connected to the wheels. The spark timing is maintained at MBT.

At time t1, a maximum available torque reserve estimation is preemptively carried out. The maximum available torque reserve is a combination of maximum available motor torque reserve and maximum available engine torque reserve. The maximum available motor torque reserve is a function of an auxiliary system demand and a maximum available motor torque. The maximum available motor torque is directly proportional to a state of charge of a battery powering an electric motor providing the motor power, motor speed, and motor temperature. The maximum available engine torque reserve is a function of the driver torque demand and a maximum generable engine torque. At time t2, the transmission system gear is shifted from the first gear to a third gear. The shift is divided into a preparatory phase, a torque phase, and an inertia phase. In response to the gear upshift, a torque hole is anticipated and it is inferred that the torque hole (magnitude) will be higher than torque reserve available from the motor. Therefore, in order to fill the torque hole, in addition to the available motor torque reserve, during the preparatory phase, spark timing is retarded from MBT to generate a torque reserve that is sufficient to fill the difference (torque hole) between the transmission input torque and output torque during the torque phase. Since the magnitude of the torque hole is smaller than the maximum available torque reserve, the magnitude of the generated torque reserve is smaller (partial torque reserve is created) relative to the estimated maximum available torque reserve. Once the gear upshift is complete, the spark timing is returned to MBT.

Vehicle operation is continued between time t3 and t4. Between time t4 and t5, the vehicle is propelled via motor torque and the engine is not operated. At time t5, a maximum available torque reserve estimation is preemptively carried out. Since the engine is not operational, the maximum available torque reserve is the maximum available motor torque reserve. The maximum available motor torque reserve is estimated as a function of torque demand and maximum available motor torque. The torque demand is a combination of driver torque demand as estimated via an accelerator pedal position sensor and an auxiliary systems (such as cabin heating system) power demand. The maximum available motor torque is directly proportional to a state of charge of a battery powering an electric motor providing the motor power, motor speed, and motor temperature. At time t6, the transmission system gear is shifted from the second gear to the third gear. The magnitude of the torque hole created during this upshift is smaller than the magnitude of the torque hole created during the previous upshift (at time t2). Motor torque from the torque reserve is provided to fill the torque hole during the preparatory phase of the upshift.

Vehicle operation is continued between time t7 and t8. Between time t8 and t9, the vehicle is propelled via a combination of engine torque and motor torque. The spark timing is maintained at MBT. At time t9, a maximum available torque reserve estimation is preemptively carried out. Since both the engine and the motor are operational, the maximum available torque reserve is a combination of maximum available motor torque reserve and maximum available engine torque reserve and is estimated by the previously described method. At time t10, the transmission system gear is shifted from the second gear to a fourth gear. It is anticipated that the magnitude of the torque hole created during this upshift is higher than the respective magnitudes of the torque holes created during the previous upshifts (at time t2 and t6) and the torque reserve available from the motor is not sufficient to fill the hole. In response to the gear upshift, in addition to the available motor torque reserve, during the preparatory phase, spark timing is retarded from MBT and power is provided from the motor to generate a maximum possible torque reserve that will fill the difference between the transmission input torque and output torque during the torque phase. Since the magnitude of the torque hole is equal to the estimated maximum available torque reserve, spark is retarded to the maximum possible limit without causing a misfire. Since at time t2, a partial torque reserve was created, the amount of spark retard at time t2 was lower than the amount of spark retard at time t10. Once the gear upshift is complete, the spark timing is returned to MBT. After time t11, the vehicle may be continued to be operated with engine torque and machine torque.

In this way, prior to a gear upshift, a maximum possible torque reserve may be estimated and then during the upshift, the torque reserve is generated to improve torque hole fill and ensure smooth transition of gear.

An example method for a hybrid vehicle comprises: generating a torque reserve during a gear upshift by adjusting vehicle operation responsive to an estimated maximum torque reserve based on each of a driver torque demand, an auxiliary system demand, and a maximum generable engine torque. In any preceding example, additionally or optionally, the hybrid vehicle is operated by a combination of engine torque and motor power. In any or all of the preceding examples, additionally or optionally, the auxiliary system demand is provided by the motor power. In any or all of the preceding examples, additionally or optionally, the maximum generable engine torque is based on torque generated by retarding spark timing from maximum brake torque, an amount of spark retard based on a misfire threshold. In any or all of the preceding examples, the method further comprising, additionally or optionally, estimating an engine torque reserve as a function of the driver torque demand and the maximum generable engine torque. In any or all of the preceding examples, the method further comprising, additionally or optionally, estimating a motor torque reserve as a function of the auxiliary system demand and a maximum available motor torque. In any or all of the preceding examples, additionally or optionally, the maximum available motor torque is a function of one or more of a state of charge of a battery powering an electric motor providing the motor power, an electric motor speed, and an electric motor temperature. In any or all of the preceding examples, additionally or optionally, the maximum torque reserve is a function of the estimated engine torque reserve and the estimated motor torque reserve, the maximum torque reserve lower than or equal to the generated torque reserve. In any or all of the preceding examples, additionally or optionally, the estimating the torque reserve is prior to the gear upshift from a lower gear ratio to a higher gear ratio in a transmission system, the transmission system being a motor hybrid transmission having a clutch configured to mechanically and selectively isolate each of the engine and the electric motor of the hybrid vehicle from the transmission system. In any or all of the preceding examples, additionally or optionally, during the gear upshift, the generated torque reserve increases transmission input torque to a target torque, the target torque based on a desired transmission output torque at the higher gear ratio. In any or all of the preceding examples, additionally or optionally, the torque reserve is generated by one or more of retarding spark from maximum brake torque (MBT) and increasing a throttle opening.

Another example method for a hybrid vehicle, comprises: prior to an upshift event in a transmission system gear ratio, during a first condition, estimating a torque reserve based on torque demand and maximum available motor torque, during a second condition, estimating the torque reserve based on a torque demand, a maximum generable engine torque, and a maximum available motor torque, and during the upshift event, generating the torque reserve by adjusting vehicle operation. In any preceding example, additionally or optionally, the first condition includes the vehicle being operated by an electric motor with an engine non-combusting, and the second condition includes the vehicle being operated by a combination of engine torque and motor torque. In any or all of the preceding examples, additionally or optionally, the torque demand is a combination of driver torque demand and an auxiliary systems power demand. In any or all of the preceding examples, additionally or optionally, during the second condition, an engine torque split includes the driver torque demand, and the electric motor torque split includes the auxiliary systems power demand. In any or all of the preceding examples, additionally or optionally, the maximum available motor torque is a function of a state of charge of a battery powering the electric motor, a speed of the electric motor, and motor temperature, and the maximum generable engine torque is a function of a maximum air path reserve that can be generated by retarding spark from MBT and the driver torque demand. In any or all of the preceding examples, additionally or optionally, the generated torque reserve compensates for a difference between a transmission input torque and a desired transmission output torque during a torque phase of the upshift event, the torque reserve being generated by one or more of retarding spark from MBT and increasing torque opening.

Yet another example vehicle system, comprises: a controller with computer readable instructions stored on non-transitory memory that, when executed, cause the controller to: prior to a request for a motor hybrid transmission system gear ratio upshift, estimate a non-zero torque reserve based on one or more of a driver torque demand, an auxiliary system torque demand, a maximum generable engine torque, and a maximum available motor torque, and in response to the request for the gear ratio upshift, generate the torque reserve by adjusting spark timing and/or throttle opening. In any preceding example, additionally or optionally, the maximum available motor torque is based on one or more of a state of charge of a battery powering an electric motor, a speed of the electric motor, motor temperature, the driver torque demand, and the auxiliary system torque demand, and the maximum generable engine torque is based on one or more of a maximum air path reserve that can be generated by retarding spark from MBT the driver torque demand, and the auxiliary system torque demand. In any or all of the preceding examples, additionally or optionally, the vehicle system includes the electric motor disposed between an engine and the transmission system, the engine being selectively coupled to the motor and the transmission system via a disconnect clutch.

In another representation, a method for a hybrid vehicle comprises: during a first gear upshift, estimating a first maximum available torque reserve based on an engine torque reserve and a motor torque reserve and then generating a first torque reserve by adjusting spark timing and/or throttle opening, the first torque reserve lower than the first maximum available torque reserve; and during a second gear upshift, estimating a second maximum available torque reserve based on the engine torque reserve and the motor torque reserve and then generating a second torque reserve by adjusting spark timing and/or throttle opening, the second torque reserve equal to the second maximum available torque reserve. In any or all of the preceding example, additionally or optionally, the first maximum available torque reserve is higher in magnitude relative to the second maximum available torque reserve. In any or all of the preceding examples, additionally or optionally, a magnitude of a first torque hole created during the first gear upshift is smaller than the magnitude of a second torque hole created during the second gear upshift. In any or all of the preceding examples, additionally or optionally, wherein adjusting spark includes retarding spark timing from MBT, an amount of spark retard higher during the second gear upshift relative to the first gear upshift. In any or all of the preceding examples, additionally or optionally, wherein adjusting throttle opening includes increasing the throttle opening, the throttle opening higher during the second gear upshift relative to the first gear upshift.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
during a first gear upshift,
estimating a first maximum torque reserve of the hybrid vehicle based on an engine torque reserve and a motor torque reserve; and then
generating a first torque reserve by adjusting vehicle operation, wherein the adjusting vehicle operation is based on a difference between a transmission input torque and a transmission output torque during the first gear upshift, the first torque reserve lower than the first maximum torque reserve of the hybrid vehicle; and
during a second gear ratio upshift,
estimating a second maximum available torque reserve of the hybrid vehicle based on the engine torque reserve and the motor torque reserve; and then
generating a second torque reserve by adjusting the vehicle operation, the second torque reserve equal to the second maximum available torque reserve.

2. The method of claim 1, wherein the hybrid vehicle is operated by a combination of engine torque and motor power.

3. The method of claim 1, wherein the engine torque reserve is a function of a driver torque demand and a maximum generable engine torque, and wherein the maximum generable engine torque based on torque generated by retarding spark timing from maximum brake torque (MBT), an amount of spark retard based on a misfire threshold.

4. The method of claim 1, wherein the motor torque reserve as a function of an auxiliary system demand and a maximum available motor torque.

5. The method of claim 4, wherein the maximum available motor torque is a function of one or more of a state of charge of a battery powering an electric motor providing motor power, an electric motor speed, and an electric motor temperature.

6. The method of claim 5, wherein the estimating the first maximum torque reserve is prior to the first gear upshift from a lower gear ratio to a higher gear ratio in a transmission system, and wherein the estimating the second maximum torque reserve is prior to the second gear upshift from another lower gear ratio to another higher gear ratio in a transmission system, the transmission system being a motor hybrid transmission having a clutch configured to mechanically and selectively isolate each of the engine and the electric motor of the hybrid vehicle from the transmission system.

7. The method of claim 6, wherein, during the first gear upshift, the generated first torque reserve increases the transmission input torque to a target torque, the target torque based on a desired transmission output torque at the higher gear ratio.

8. The method of claim 1, wherein the adjusting vehicle operation includes one or more of retarding spark from MBT and increasing a throttle opening.

9. The method of claim 1, wherein the first maximum available torque reserve is higher in magnitude relative to the second maximum available torque reserve and wherein the difference between the transmission input torque and the transmission output torque during the first gear upshift is smaller than the difference between the transmission input torque and the transmission output torque during the second gear upshift.

10. A method for a hybrid vehicle comprising:
during a first upshift event in a transmission system gear ratio,
estimating a first maximum available torque reserve based on an engine torque demand and a motor torque reserve and then generating a first torque reserve by adjusting vehicle operation, the first torque reserve lower than the first maximum available torque reserve; and
during a second upshift event in the transmission system gear ratio,
estimating a second maximum available torque reserve based on the engine torque demand motor torque reserve, and then
generating a second torque reserve by adjusting the vehicle operation, the second torque reserve equal to the second maximum available torque reserve.

11. The method of claim 10, wherein the motor torque reserve is a function of a state of charge of a battery powering an electric motor, a speed of the electric motor, and motor temperature.

12. The method of claim 10, wherein the first generated torque reserve compensates for a first difference between a first transmission input torque and a first desired transmission output torque during a torque phase of the first upshift event, and wherein the second generated torque reserve compensates for a second difference between a second transmission input torque and a second transmission output torque during another torque phase of the second upshift event, each of the first torque reserve and the second torque reserve being generated by one or more of retarding spark from MBT and increasing a throttle opening.

13. A vehicle system, comprising:
a controller with computer readable instructions stored on non-transitory memory that, when executed, cause the controller to:
prior to a request for a motor hybrid transmission system gear ratio upshift,
estimate a non-zero maximum torque reserve based on one or more of a driver torque demand, an auxiliary system torque demand, a maximum generable engine torque, and a maximum available motor torque;
in response to the request for the gear ratio upshift,
generate a torque reserve by adjusting spark timing and/or throttle opening, wherein an amount of spark timing adjustment is estimated based on a difference between a transmission input torque and a transmission output torque during the gear ratio upshift, the amount of spark timing adjustment directly proportional to the difference between the transmission input torque and the transmission output torque;
during a first gear ratio upshift, estimate a first maximum available torque reserve based on an engine torque reserve and a motor torque reserve and then generate a first torque reserve by adjusting the spark timing and/or the throttle opening, the first torque reserve lower than the first maximum available torque reserve; and during a second gear ratio upshift, estimating a second maximum available torque reserve based on the engine torque reserve and the motor torque reserve and then generating a second torque reserve by adjusting the spark timing and/or the throttle opening, the second torque reserve equal to the second maximum available torque reserve.

14. The system of claim 13, wherein the maximum available motor torque is based on one or more of a state of charge of a battery powering an electric motor, a speed of the electric motor, motor temperature, the driver torque demand, and the auxiliary system torque demand, and the maximum generable engine torque is based on one or more of a maximum air path reserve that can be generated by retarding spark from MBT, the driver torque demand, and the auxiliary system torque demand.

15. The system of claim 14, wherein the vehicle system includes the electric motor disposed between an engine and the transmission system, the engine being selectively coupled to the motor and the transmission system via a disconnect clutch.

* * * * *